Dec. 16, 1958    C. F. HISKEY    2,864,506
DEVICE FOR ULTRAFILTRATION
Filed Nov. 30, 1953    2 Sheets-Sheet 1
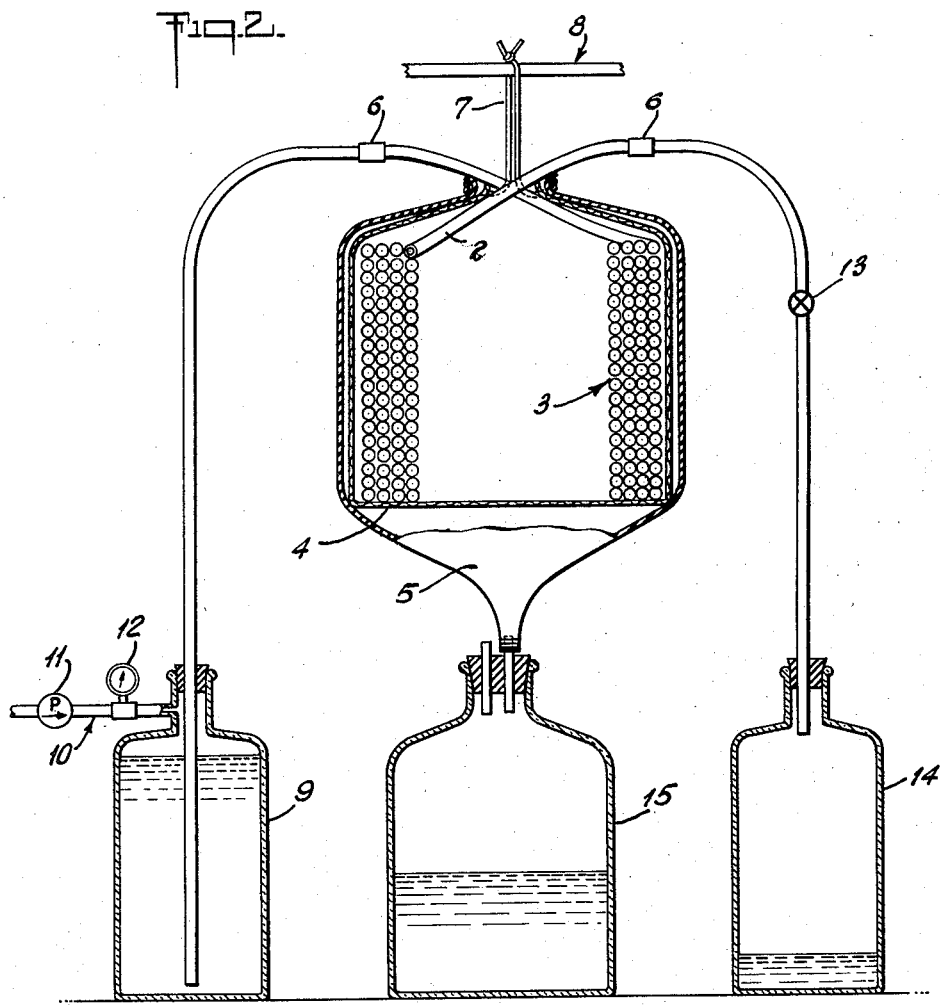
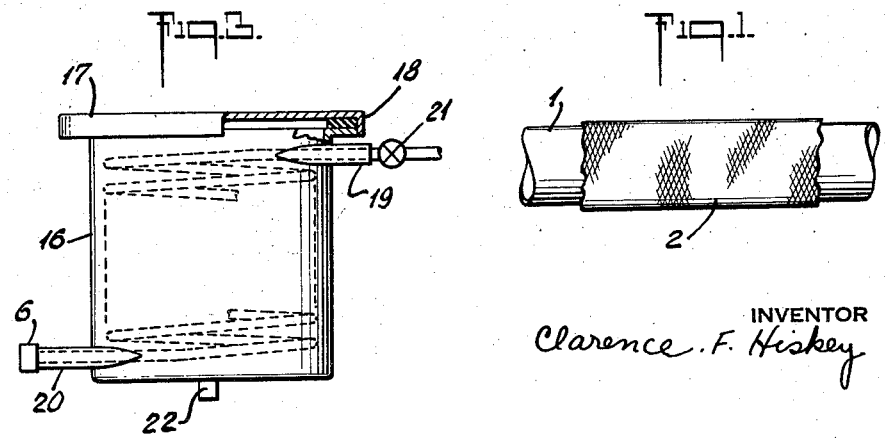
INVENTOR
Clarence F. Hiskey Dec. 16, 1958     C. F. HISKEY     2,864,506
DEVICE FOR ULTRAFILTRATION
Filed Nov. 30, 1953     2 Sheets-Sheet 2
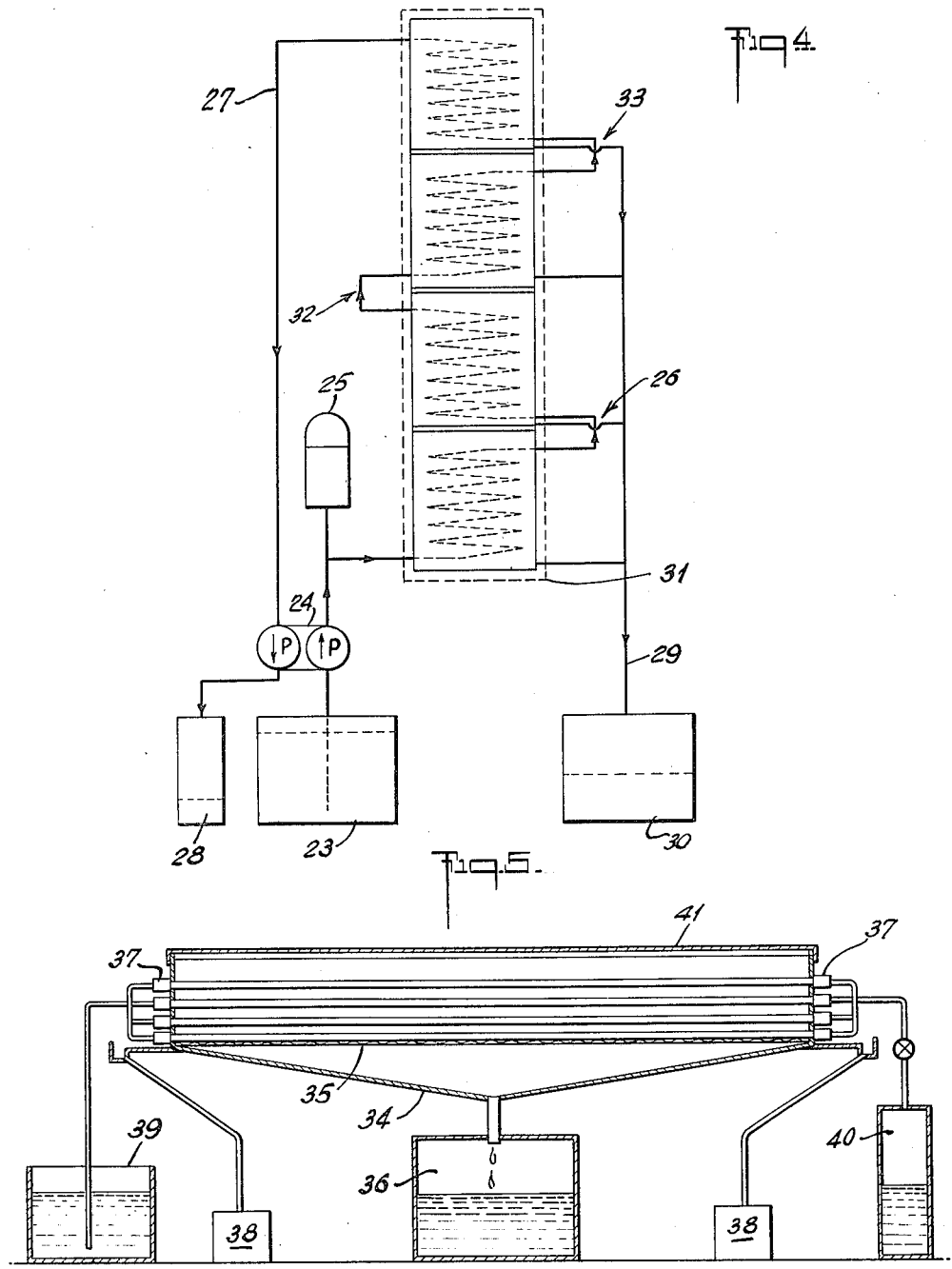
INVENTOR
Clarence F. Hiskey United States Patent Office 2,864,506
Patented Dec. 16, 1958

2,864,506
DEVICE FOR ULTRAFILTRATION

Clarence F. Hiskey, Brooklyn, N. Y.

Application November 30, 1953, Serial No. 395,036

3 Claims. (Cl. 210—321)

This invention relates to a process for ultrafiltration and of the application and use of that process in apparatus and devices used to ultrafilter solutions.

Ultrafiltration is defined as a method of filtration whereby molecules dissolved in some fluid medium may be extracted from that medium by virtue of the larger size of the molecule relative to the size of the pore in the filter. It follows that if there are present in solution, molecules of a variety of sizes, then some will pass through the filter in virtually undiminished concentration, while the largest ones may be completely retained. On the other hand, those whose sizes are comparable to the average pore size of the filter will pass through to varying degrees.

Now while ultrafiltration is a well known process and has been applied to laboratory size samples for at least 70 years, it does not find extensive commercial application at the present time. The reason for this is that its application is severely limited by a high initial cost for equipment, coupled with a very high operating cost as well as extremely slow operation. It is the purpose of this invention to effectuate a practical process for large scale ultrafiltration.

For the purpose of providing a clear understanding of what follows, a number of terms will now be defined.

(a) *Solution.*—This refers to any medium containing both high and low molecular weight fractions which it is intended to fractionate by the ultrafiltration process.

(b) *Ultrafiltrate or filtrate.*—These refer to that part or fraction of the solution previously described which passes through the filter membrane. It will contain the lower molecular weight components of the solution and in general be devoid of the higher molecular weight components.

(c) *Residue.*—This is that part or fraction of the solution previously described which is retained by the filter membrane. It will contain the higher molecular weight components of the solution in greater concentration than is present in the solution.

(d) *Ultrafilter or filter.*—These refer to the complete apparatus into which solution is fed and is there divided into ultrafiltrate and residue.

(e) *Filter membrane.*—This term refers to that component of the ultrafilter which because it possesses pores of molecular dimensions will function as a molecular sieve. In general it is the element which permits the passage of the particles in solution whose size is small relative to the size of the pores and retains those particles whose size is large relative to the pore size.

(f) *Stack.*—This refers to an assembly of individual filter units, usually stacked one on top of the other, which permits either faster filtration or more thorough fractionation depending upon what is desired.

(g) *Dialysis.*—A process of separating crystalloids and colloids in solution by employing the difference in their rates of diffusion through a semi-permeable membrane; crystalloids pass through readily, while the colloids pass very slowly or not at all.

Dialysis differs from ultrafiltration by virtue of the fact that the driving force for the dialysis operation is the concentration gradient through the membrane. Therefore the force is diffusive in character. Ultrafiltration on the other hand requires a large pressure difference across the membrane in order to get solution to flow through it. In addition there is no concentration gradient of the low molecular weight material in the membrane as there is in dialysis. The process of ultrafiltration is used when a dilution of the end filtrate is not desirable or it is necessary to remove all of the larger molecular weight material, keeping the solution of lower molecular weight material at the same or very close to the same concentration.

Fig. 1 is a partial top view of a piece of permeable tube covered by a perforated protective casing;

Fig. 2 is a vertical cross-sectional view illustrating the apparatus embodying the invention and for carrying on the inventive process;

Fig. 3 is a vertical view of a portion of the apparatus with parts broken away and in cross-section;

Fig. 4 is a diagram of apparatus embodying the invention and illustrating a modification; and Fig. 5 is a vertical cross-sectional view of apparatus embodying the invention and illustrating a further modification.

A novel element of the process and device is a tubular filter membrane of great length surrounded by a porous sleeving throughout its entire length. See Figure 1. There I schematically represent long porous membrane 1 which has been inserted into, 2, a porous sleeving. With suitable closures at each end, fluids may be forced into this tubular filter membrane under great pressures, whereupon the membrane is pressed against the sleeving and is prevented from rupturing by the support it receives from the sleeving.

When suitably constructed the pressure limitations imposed upon the filtration process are those determined by the strength of the sleeve and not those of the fragile membrane. The limits of speed of filtration are only determined by the pressure which may be applied to the system, all other elements remaining constant.

The tubular membrane used in this filter may be made of any of, but not restricted to the following: cellophane, cellulose, parchment, rubber, synthetic rubbers or plastic materials, etc. of such quality and thickness that there is an appreciable flow per unit area of tube surface through its micropores. Choice of suitable material will be determined by the nature of the molecular sieving operation to be accomplished. Illustrations of such choice will be given below in connection with the description of typical processes.

In general the diameter of these porous membranes should be as small as is consistent with flow rates through them. It will be recognized that the filter area of any given tube is proportional to $2\pi rl$ whereas the volume of the tube is proportional to $\pi r^2 l$. In these expressions $r$ is the radius of the tube and $l$ is its length. It will be seen from this that the volume of the tube increases faster than the filter area of tube as the radius is increased.

Operating with large radii will give an apparatus with large holdup and large volume for any given ultrafiltration rate. This will lead to increased costs and consequently should be avoided.

The porous sleeving may be made from a wide variety of materials and in a wide variety of ways depending upon the chemical system to which ultrafiltration is to be applied. Sleevings are made of cotton, nylon, muslin, copper or stainless steel wire, glass, etc. They may be made in a separate operation, in which case the filter membrane is threaded through them. They may also be directly braided over the filter membrane while it is fed into a typical commercial braiding machine. They may also be knit around a filter membrane which is continously fed into a circular knitting machine. Thus there are no restrictions on the type of material which may be used for the sleeving nor in the method of assembly of these two parts. In addition, it should now be self evident that ultra filters of any length can be made by such an approach. The porous sleeving may also be made by taking wire cloth, glass cloth or other material and folding them into a tubular shape followed by sewing, welding or in any suitable fashion forming a tight seam throughout the length of the tube. The greater the pressure employed the smaller the grain of the supporting sleeving must be. For example I have used sleeving with interstices as large as $\frac{1}{16}''$ when I applied 105 lb. pressure to sausage casing .001" in thickness with no rupture. However for higher pressures, a finer mesh supporting grid has been required such as sintered glass or aluminum oxide tubes.

The closures for such tubes consist of an inner member around which the membrane and its sleeving are wrapped and an outer member which fits over the outside of the sleeving. Pressure is applied in such a way as to compress the membrane and sleeving between these two members in order to form a leaktight fit capable of withstanding the high pressure differentials which are applied when the filter is put into operation.

The closures refered to above may be fabricated from simple laboratory supplies or purchased from manufacturers of hose connections.

There are a number of advantages which this method has over conventional ultrafiltration processes as practiced at the present time. These may be itemized as follows:

(1) The apparatus consisting mostly of cloth and membrane material has a cost which is vanishingly small by comparison with the big filter-presses commonly used for this purpose.

(2) Because the tubular material is coiled in bags or metal or plastic containers an enormous surface area is supplied in an apparatus of relatively small volume. Since the rate of ultra-filtration is directly proportional to the area of the filter surface it can be seen that these units have high throughputs for relatively small apparatus volume.

(3) Since closures are needed on only two ends of the tubular membrane the possibility of leakage, which in conventional filterpresses is a continuing problem is avoided. This has the advantage of minimizing waste and operational costs.

(4) Because the porous sleeving gives enough support to the tubular membrane, so that hundreds of pounds of pressure may be applied, this device has an enormous advantage over dialysis devices built along somewhat similar lines. The rate of material transport in dialysis is based on a difference in concentration of diffusible material on either side of the membrane, whereas in ultra-filtration it is directly proportional to the pressure differential.

Having now disclosed the general and essential features of my invention I shall next illustrate a few typical assemblies of the filter so as to make its application more fully understood.

In Fig. 2 a vertical cross section through the center of one model of the complete ultrafilter is given. 3 represents the cross section of the filter membrane and its porous sleeving. Because the membrane is only 0.001" in thickness and the sleeving only 0.002" in thickness these two are represented by a single line. The tubular membrane is, of course, surrounded on the outside by the sleeving. By way of example: the membrane in one particular model which was made has a 1¼" diameter and was surrounded by cotton sleeving 1" in diameter. The large diameter of the membrane was chosen deliberately to avoid rupture in the event that the sleeving bulged in any point throughout its length. The whole filter membrane was 280 feet long. After the closures 6 were put on at each end, the filter was inflated with air and in this condition was coiled on a 9" diameter knock down spool not shown in the diagram. It had, as can be seen in the figure, 19 turns on each of the four layers. While still on the spool a muslin bag 4 was slipped over the whole filter with only the closure ends 6 protruding from the drawstring open end. The spool was now disassembled and removed from the bag. The drawstring was next pulled snugly around the two closures. Then the entire bag was lowered into an outer rubber bag 5 fitted with a drain at the bottom. The whole unit was now hung on a hook 8 by means of the draw strings 7 of the muslin bag. The air was withdrawn from the filter by means of an aspirator and then replaced with solution to be ultrafiltered. To complete the apparatus, a storage tank 9 containing the solution to be ultrafiltered was connected to one of the closures by means of metal or rubber tubing. Air pressure was applied by means of the air line 10 from pressure source 11 with a pressure gauge 12 to indicate the number of pounds of pressure applied. The liquid in 9 flows through the pipe connected to the filter, through the filter tube and out through the needle valve 13 and into the residue receiver 14. During the normal operation of the filter the needle valve is kept closed allowing the pressure to force the ultrafiltrate out through the micropores of the filter tube membrane. The liquid is guided by the outlet of the outside bag 5 into the ultrafiltrate receiver 15. As the filtration proceeds the solution in the exit end of the filter membrane becomes more and more concentrated with respect to the high molecular weight material that is retained. This solution may become a very viscous paste. Under these conditions filtration ceases in that part of the membrane. To eliminate this problem the needle valve is occasionally opened allowing the pastes or viscous solution to be expelled into the residue receiver 14. Usually some set ratio is maintained between the ultrafiltrate and residue withdrawals. In the apparatus described in Fig. 2, this is done by manual control but as seen in Fig. 4 and described below, it can be just as effectively controlled by means of a proportionating pump.

An important feature of this as well as every other ultrafilter to be described herein, is the arrangement of the closure relative to the ultrafiltrate. It can be seen by reference to Fig. 2, that in the event of leakage of solution at either of the closures, their situation is such that the mixing of this leakage with the ultrafiltrate or residue is completely prevented. This is important to the production of pure ultrafiltrates or residues.

Sterile and pyrogen free operation of the ultrafilter in Fig. 2 may be achieved by first washing all of the materials prior to the assembly of the apparatus. After the filter is assembled it may be further washed by flowing distilled pyrogen free water over the outside of the filter coils. Then it and all other apparatus can be appropriately wrapped and sterilized with high pressure steam at elevated temperatures.

The container for the filter membrane need not be a muslin sack surrounded by the rubber outer bag. The filter may be put in a glass or metal container and coiled in exactly the same way. It may also be arranged in alternative ways. For example, another arrangement using aluminum, porcelain, or stainless steel pots is shown in Fig. 3. 16 is the pot of any suitable size or shape. It may be fitted with a tight cover 17 and a gasket 18 to enable an air tight closure at that point. 19 and 20 are two pipes attached tangentially to the outer wall of the pot. Where the pipe connects with the pot, a soldered or brazed airtight fit is made. To assemble the filter, the membrane, previously encased in its sleeving, is first threaded through pipe 20 from the inside of the pot.

The closure is then made on the membrane with provision to achieve an airtight fit between the outside surface of the membrane closure and the inside surface of the pipe 20. The closure is on the outside of the pot. In this way provision is made for any leakage at the closure to drip to the outside of the pot and not into the pot where it could contaminate the ultrafiltrate. Having made this first closure the filter membrane is inflated with air and then coiled inside the pot. The first layer of coils starts from the outside and is coiled inward in a spiral form. The second layer is begun when the radius of the curvature of the first layer coil becomes too great for easy flow through the filter membrane tube. This second layer is coiled from the inside outward again in a spiral form. When the wall of the pot is reached, the third layer coiling inward is now begun. This can be done as many times as the length of the filter membrane permits. Finally the end of the membrane is brought out through the pipe at 19. To do this it is usually necessary to remove the temporary closure put on when the tube is inflated in order to pass the terminal end of the filter membrane through the pipe. A closure identical with that at 20 is now made. Solution is now fed into the filter under pressure through 6 and the air in the tube is allowed to flow out at 19. When all the air is displaced, a valve 21 on the line leading from 19 may be closed thus preventing the solution from flowing into the residue collector before most of the low molecular weight material has been filtered out.

A number of units such as that pictured in Fig. 3 may be stacked one on top of the other without difficulty since the drainage port, for the ultrafiltrate may be made on the side wall. A stack of these units may be hooked up either in a parallel or a series network as regards their solution and residue lines. Regardless of how these units are interconnected it is usually advisable to connect the ultrafiltrate lines in a parallel network so that all the ultrafiltrate collects in one place.

Stacked units may be placed in heated cabinets for the purpose of speeding the filtration process. Inasmuch as the viscosity of most solution varies in some inverse way with respect to temperature and also because Poiseuilles' relationship governs the flow rate through the membrane pore, it may be advisable to work at elevated temperatures. This can be done only when the materials are not themselves affected by sustained periods of heating.

In Fig. 4 a schematic drawing of such a stack of filter units is shown. In this schematic there are only four units pictured but of course any number might have been arranged here. The solution to be filtered is contained in 23 from where it flows out and upward through a proportioning pump 24. 25 is a surge tank fitting with a circuit breaker to stop the proportioning pump motor whenever the pressure rises above a predetermined value. When the pressure in 25 falls below some other lower value the motor is turned on by the circuit breaker. The solution flows into the lowest filter coil at the bottom layer and out of it at its top layer. From there it proceeds to the bottom layer of the next higher unit at coupling 26. In this way it traverses all four filter units. As the solution progresses through the filter units most of its volume is lost by ultrafiltration. When it arrives at the top layer of the uppermost unit it is highly concentrated as regards the high molecular weight materials and substantially free of low molecular weight materials and solvent. It is now withdrawn from the system by means of another section of the proportioning pump 24 through pipe line 27 and delivered into the residue receiver 28.

The ultrafiltrate from the four units flows into the single manifold 29 connecting them to the ultrafiltrate receiver.

The dotted lines surrounding the four ultrafilters represent a cabinet 31 which may be set at any desired temperature.

As the solution passes upwards through the first unit, it will lose a fraction of its solvent and low molecular weight material. On passing through the second unit it will lose a nearly similar fraction of the remaining solvent and low molecular weight material. Thus if in the first unit 50 percent of the low molecular constituents were filtered out so that the concentration of the molecules retained was doubled, then in the second filter 50 percent of what remained would also be filtered out. This would leave the concentration of the molecules retained four times greater than in the original solution. On the other hand, the amount of ultrafiltrate from the second unit would be only half that from the first.

If each unit removed 50 percent of the low molecular weight materials in this fashion, we would have the following situation at the end of the fourth stage:

If $V=$ gallons per hour of solution entering stack then $VR$ (the gallons per hour of residue leaving the stack) would equal $V \times (1/2)^4$ or $1/16\ V$. The gallons per hour of ultrafiltrate at stage 1, would be $V_1$ and be equal to $V/2$. At stage $2 = V_2 = V/4$, at stage $3 = V_3 = V/8$, and at stage $4 = V_4 = V/16$. The rate of ultrafiltrate production will equal $V$ u. f. $= V_1$ and $V_2$ and $V_3$ and $V_4 = 15/16\ V$.

As a stack of filters are kept in operation there is a tendency for them to plug and in due course their output falls to a fraction of their initial value. When operated in stacks it is only necessary to introduce a new unit at the bottom of the stack meanwhile removing the topmost unit, which will have had the longest period of service. In this way a stack may be maintained at a fairly constant level of output with only a moderate amount of attention. If one wishes to double or treble the output of an ultrafiltration plant, this may be done by putting two or three stacks respectively in parallel with each other. The proportioning pumps must however control the solution feed and the residue withdrawal for each stack independently although they may draw from a common reservoir of solution and feed the residue and ultrafiltrate to a common residue receptacle and a common ultrafiltrate receptacle.

This method of in-series operation is a particularly useful one for the preparation of salt free blood plasma. Here the problem is to remove the easily filterable electrolyte while retaining the blood proteins on the filter. Accordingly the plasma is withdrawn from 23 and passed into the first ultrafiltration stage. Let us assume again that its volume is shrunk 50% by loss of solution through the membrane. Therefore the blood serum proteins will be doubled in concentration as they leave the first unit. At this point 26 a volume of pyrogen free sterile water equal to that of the ultrafiltrate produced in the first stage is injected to return the serum protein concentration to its original value. However, in this instance the serum electrolyte concentration will be only one half that in the original solution. If in the second stage the solution is divided again into 50% ultrafiltrate and 50% residue and at 32 sterile pyrogen free water is injected to make up for the volume of ultrafiltrate lost we again achieve a substantial reduction in electrolyte concentration. The solution entering the third stage will have the original protein concentration but will have only 25% of the original electrolyte in it. If we continued in this same way through two more stage making water injections at 33 and 27 we would find that the residue going to 28 would have only 6% of its original electrolyte but still have its original protein concentration to any desired value.

It is obvious that if at each stage the percentage removed as ultrafiltrate is increased beyond 50%, then we can achieve the elimination of electrolyte to any desired extent with fewer stages.

It is also obvious that the method of operation applicable to this blood plasma problem will find wide application whenever it is desired to separate low molecular form high molecular components. Thus the fractionation of hydrolyzed native dextran to produce a clinical grade of material is another instance which may be cited here. There are many other such cases which will develop as my art becomes better known.

Another type of apparatus in which the tubular ultrafilter can be used is that shown in schematic cross section in Fig. 5. This type of unit is preferred where compactness and low initial capital expenditure is not essential. It consists of a shallow trough 34 having a screen bottom 35 through which the ultrafiltrate can drip. The drip from the screen bottom falls on a shallow incline and is thus led into the reservoir 36 where the ultrafiltrate is collected. On each end of this trough is a header 37 having a number of parts through which the tubular membrane is led and terminated in a closure outside of the trough. Any drip from the closures collects in an auxiliary trough outside the header and ultimately flows into waste receptacles 38. In the diagram four tubular membranes are represented with their sleevings and stacked one above the other. They are arranged for parallel flow. The solution from tank 39 is forced through the filter by some pressure device and the residue ends up in receiver 40. The entire apparatus is covered 41 with a hinged cover which extends the full length of the filter elements. These elements may be of any desired length, the longer the better.

I claim:

1. Apparatus for molecular filtration comprising a flexible tubular membrane, a porous flexible sleeve thereon coextensive therewith and next adjacent thereto, means to apply pressure to a solution within said tubular membrane to force filtrate through the walls of said membrane and sleeve, leaving the residue in said membrane, and means to remove the residue lengthwise through said membrane, in combination with a chamber housing said tubular membrane and sleeve to receive the filtrate forced through said membrane and sleeve, said chamber having a porous portion through which said filtrate may pass.

2. The combination of claim 1, and an outer casing enclosing the chamber to receive the filtrate passing through said porous portion of said chamber, a vessel, said casing having means to lead said filtrate to said vessel.

3. The combination of claim 1, said chamber comprising a bag of textile cloth.

References Cited in the file of this patent

UNITED STATES PATENTS

| | | |
|---|---|---|
| 339,722 | Wiles | Apr. 13, 1886 |
| 402,957 | Medrick | May 7, 1889 |
| 1,825,631 | Horvath | Sept. 29, 1931 |
| 1,843,242 | Rafton | Feb. 2, 1932 |
| 2,411,238 | Zender | Nov. 19, 1946 |
| 2,650,709 | Rosenak et al. | Sept. 1, 1953 |
| 2,687,997 | Marchand | Aug. 31, 1954 |
| 2,715,097 | Guarino | Aug. 9, 1955 |

FOREIGN PATENTS

| | | |
|---|---|---|
| 12,509 | Germany | June 17, 1880 |
| 836,733 | France | Oct. 25, 1938 |
| 53,795 | France | Apr. 29, 1946 |
| | (Addition to No. 836,733) | |
| 517,737 | Belgium | Mar. 17, 1953 |
| 721,087 | Great Britain | Dec. 29, 1954 |